(12) United States Patent
Manssour

(10) Patent No.: US 8,824,416 B2
(45) Date of Patent: Sep. 2, 2014

(54) METHOD AND A RADIO BASE STATION IN A COMMUNICATION NETWORK SYSTEM

(71) Applicant: Telefonaktiebolaget LM Ericsson (publ), Stockholm (SE)

(72) Inventor: Jawad Manssour, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 141 days.

(21) Appl. No.: 13/650,164

(22) Filed: Oct. 12, 2012

(65) Prior Publication Data

US 2013/0272213 A1 Oct. 17, 2013

Related U.S. Application Data

(60) Provisional application No. 61/560,546, filed on Nov. 16, 2011.

(30) Foreign Application Priority Data

Nov. 16, 2011 (EP) ..................................... 11189334

(51) Int. Cl.
*H04W 72/04* (2009.01)
*H04W 24/02* (2009.01)
*H04W 72/12* (2009.01)
*H04W 88/08* (2009.01)

(52) U.S. Cl.
CPC .............. *H04W 72/04* (2013.01); *H04W 24/02* (2013.01); *H04W 72/121* (2013.01); *H04W 72/1221* (2013.01); *H04W 72/1236* (2013.01); *H04W 88/085* (2013.01)

USPC ........... 370/330; 370/329; 370/341; 370/478; 455/453

(58) Field of Classification Search
USPC .......... 370/329, 330, 340, 341, 478; 455/450, 455/451, 452.1, 452.2, 453
See application file for complete search history.

(56) References Cited

U.S. PATENT DOCUMENTS

| | | |
|---|---|---|
| 2006/0217158 A1 | 9/2006 | Uwano et al. |
| 2010/0042716 A1* | 2/2010 | Farajidana et al. ........... 709/224 |
| 2010/0074189 A1 | 3/2010 | Wang et al. |
| 2010/0290413 A1 | 11/2010 | Kuwahara |
| 2011/0096736 A1 | 4/2011 | Kwon et al. |
| 2014/0004862 A1* | 1/2014 | Ekemark, Sven ............. 455/443 |

* cited by examiner

*Primary Examiner* — Hoon J Chung
(74) *Attorney, Agent, or Firm* — Murphy, Bilak & Homiller, PLLC

(57) ABSTRACT

Methods and apparatus for controlling signaling processing resources that are shared among two or more cells at a base station, such that signaling processing resources are efficiently utilized and such that resources assigned for sending uplink grants and downlink assignments on a downlink control channel that is shared among the mobile terminals in each cell is also efficiently used. An example method is an iterative process whereby a manager controlling the assignments of resources on the downlink control channel among the mobile terminals on each cell is requested to provide resource to a restricted number of mobile terminals for a cell. This is repeated for each cell until a total processing capacity for the site is reached. The restriction in the number of mobile terminals included in each request relates to the total capacity for processing remaining on the site.

15 Claims, 9 Drawing Sheets

METHOD AND A RADIO BASE STATION IN A COMMUNICATION NETWORK SYSTEM

RELATED APPLICATION

This application claims the benefit of and priority to U.S. Provisional Application Ser. No. 61/560,546, filed 16 Nov. 2011, and to European Application No. EP 11189334.3, filed 16 Nov. 2011. The entire contents of said U.S. Provisional Application and European Application are incorporated herein by reference

TECHNICAL FIELD

The present application relates to a method and an apparatus for temporarily assigning radio resources among a plurality of users sharing the radio resources in a cellular radio communication system.

BACKGROUND

In cellular radio communication systems, one radio base station typically supports several cells radio communication with users in these cells. FIG. 1a is an illustration of a typical cell plan, with each of the radio base stations 110 serving three cells A, B, and C, in separate 120-degree sectors. It should be understood that a cellular radio network comprises a high plurality of cells A, B, C, and a corresponding plurality of radio base stations 110 that serve user equipment 150 with communication services in these cells A, B, C. FIG. 1a is a simplification of a total cellular radio system, as it illustrates only two radio base stations 110a, 110b, one of which serves the three cells, A, B and C. When building networks of this type, it is often difficult to find and get access to sites for the radio base station and antennas. Accordingly, a cell plan as is illustrated in FIG. 1a has the advantage of enabling geographical coverage with a restricted number of base station 110 sites. A further advantage by having one radio base station 110a, serving plural cells A, B, and C is that the base station's physical hardware and software resources can be shared among the cells that are served. For example, when traffic is non-uniformly distributed among the cells A, B, C served by the radio base station 110a, the computing resources available in the radio base station 110a are distributed such that more is used for taking care of traffic in the more heavily loaded one or ones of the three cells.

FIG. 2a illustrates an example architecture for a radio base station 110, having a radio equipment (RE) 112 for each of the three cells A, B, C, and a common radio equipment controller (REC) 114. The REs 112 and the REC 114 are connected via a standardized interface named the Common Public Radio Interface (CPRI). The REC communicates baseband signals and control information over the CPRI and handles all the baseband signaling processing of signals received by the REs and signals to be transmitted by the REs, and further controls the communications in the cells. The CPRI allows for a flexible construction and building of a radio base station.

A basic approach to handling increasing traffic load in a cellular system is to introduce more cells. However, the difficulty in finding sites is limiting operators' ability to increase the number of cells. One way to increase capacity with a fixed set of base station sites is the introduction of distributed RE, i.e., RE that share the same REC on one site. In this approach, antennas and REs are spread to support radio communication in spaced apart, or in more or less overlapping cells A, B, C, as illustrated in FIG. 1b, while the control of the communications is made by the REC. An example of an architecture for this type of radio base station is illustrated in FIG. 2b, with the REC 114 connected to the spaced apart REs 112 via the CPRI.

In many cellular systems, the physical radio resources on the air interface are shared among a plurality of active users based on their immediate need for communications. One such system is the Long Term Evolution (LTE) wireless system as specified by 3GPP. The radio interface for LTE is commonly named the Evolved Universal Terrestrial Radio Access (E-UTRA), which radio interface will be used in the discussion that follows as an example. E-UTRA uses orthogonal frequency division multiplexing (OFDM) in the downlink (DL) from an eNB (3GPP terminology for a base station in LTE systems) to user equipments (UEs, 3GPP terminology for mobile terminals or end stations) or terminals, and discrete Fourier transform (DFT)-spread OFDM in the uplink (UL) from a UE to an eNB.

The basic LTE downlink physical radio resource may be seen as a time-frequency grid as illustrated in FIG. 3, where each resource element, i.e. square in the grid, represents one OFDM subcarrier during one OFDM symbol interval. In the time domain, LTE downlink transmissions are organized into radio frames of 10 ms, each radio frame consisting of ten equally-sized subframes of length $T_{subframe}=1$ ms, as illustrated in FIG. 4a. Furthermore, the resource allocation in LTE is typically described in terms of resource blocks, also called Physical Resource Blocks (PRB), where a resource block corresponds to one timeslot of 0.5 ms in the time domain and twelve contiguous subcarriers in the frequency domain, as illustrated in FIG. 4b. Resource blocks are numbered in the frequency domain, starting with 0 from one end of the system bandwidth.

Scheduling is the process of assigning resources on the physical radio resource to the active users in a cell based on their respective need for communication. The UEs 150 in a cell at which data is buffered for DL transmission in the radio base station 110 are candidates for being assigned DL transmission resources. Similarly, among the UEs 150 in a cell that have requested UL resources, some UEs are selected for being granted UL transmission resources. Scheduling is based on the need for communication by the UEs, as is typically defined by UE specific scheduling weights that are provided to the scheduling process.

The UE transmissions weights are based on the amount of data buffered waiting for transmission, the type of service the UE is involved in, and associated QoS attributes such as low latency requirements, priority, etc. For the DL communication direction, this information is available in the radio base station, while for the uplink scheduling weights are produced based on information received from the UEs.

The scheduling process generally assigns resources for a period of 1 ms, which constitutes a transmission time interval (TTI) of 1 ms. The scheduling process is therefore repeated for each TTI, and the TTI period is the same as a sub-frame, i.e. 1 ms. Resource blocks scheduled to one UE in the UL direction must be allocated contiguously in the frequency domain, while there is no such restriction for the DL direction.

For each TTI, the radio base station 110 informs the UEs 150 of the resources assigned in the DL by DL assignments sent to scheduled UEs. Similarly, resources assigned in the UL direction are assigned by UL grants sent to the assigned UE. These assignments and grants are transmitted on a common DL control channel, the PDCCH (physical downlink control channel), which is carried by the first 1, 2, 3, or 4 OFDM symbol(s) in each subframe and which spans over the whole OFDM carrier bandwidth. A UE that has decoded the control information carried by a PDCCH knows which resource elements in the subframe contain data aimed for the UE. The length of the control region, in which the PDCCH is located, can vary from subframe to subframe.

Several characteristics of the PDCCH should be noted. First, the PDCCH is a costly resource. The OFDM symbol used in each subframe for the PDCCH steals resources from the physical downlink shared channel (PDSCH) that typically carries downlink data traffic. The more resources used for the PDCCH in terms of OFDM symbols, the fewer are left for carrying downlink data. For example, if three of the fourteen ODFM symbols in a frame are occupied by the PDCCH, only 79% of the subframe's capacity is left for carrying data while 21% is spent for carrying control information. Second, the PDCCH is shared by all UEs in the cell, which compete for both UL and DL transmission resources. Third, the PDCCH is cell specific.

It should also be noted that in a radio base station where signal processing resources are shared among plural cells for processing the signals of the UE in those cells, there is a limitation on the number of UEs that are possible to process.

Accordingly, for efficient use of the PDCCH and of the signaling processing capacity, care must be taken when selecting the UEs that get access to the two types of resources.

SUMMARY

One object of the present invention is to provide a process of allocating shared radio resources to plural UE such that the physical resources at the base station site and of radio resources on the air interface are efficiently used.

In accordance with one embodiment of the present disclosure, a method for allocating shared radio resources to plural UEs in a group of cells that are supported by common processing resources, where each of the UEs are served by one of the cells, comprises the steps of:
  Forming a set of candidate UEs that comprise UEs from the group of cells and that need transmission resources.
  Setting a counter i to the value of Y (i:=Y), where Y is a predefined number of UEs that are possible to process for the group of cells by common processing resources.
  Identifying a cell among the group of cells that has the most UE within a subgroup comprising a number i of the candidate UE with the most urgent need for transmission resources, and, for the identified cell, performing the further steps of
    Requesting control channel resources in the cell identified for those of the candidate UEs within the number i UEs with the most urgent need for transmission resource and that are served by the identified cell;
    Obtaining control channel resources in the identified cell for a number Z of UE;
    Reducing the counter i by the number of Z (i:=i−Z); and
    Removing all the UE that are served by the identified cell from the set of candidate UE.
  If counter i is more than zero (if i>0), and if there are still some UE in the candidate set, then repeat from the step of identifying a cell above, in a loop.

In accordance with another embodiment of the present disclosure, there is provided a radio resource unit suitable for a radio base station that has signaling processor resources that are pooled for supporting two or more cells. The radio resource unit comprises a first interface for receiving scheduling weights that are each associated with a UE and associated with one of the cells in which the UE is served. It also comprises a second interface to one or more managing units of the resources on a downlink control channel in each cell. It further comprises a processor with software, such that the processor is configured to:
  Form a set of candidate UEs based on their scheduling weights as are received over the first interface, wherein the set of candidate UEs comprise UEs from the two or more cells;
  Set a counter i to value Y (i:=Y), where value Y is a predefined number of UEs which are possible for the signaling processing resources to process for said group of cells;
  Identify a cell among set group of cells that has most UEs within a subgroup comprising a number of i of the candidate UEs with the highest scheduling weights, and, for the identified cell, being further configured to:
    Request via the second interface control channel resources in the cell identified for those of the candidate UEs within the number i UEs with the highest scheduling weights and that are served by the cell identified;
    Receive, via the second interface, information on obtained control channel resources for a number of Z UEs in the cell identified;
    Reduce counter i by the number of Z (i:=i−Z);
  If i is more than zero, i>0 and if there is/are still some UE/s in the set of candidate UEs then repeat the acts above in a loop, beginning with the act of identifying a cell.

In accordance with yet another embodiment of the present disclosure, there is provided a radio base station that comprise two or more radio equipments that are arranged to handle the radio communication in a respective cell (A-C, A-F) and a radio equipment controller with an interface to the radio equipments and arranged to exchange baseband radio signals and control signals over the interface with the radio equipments, the radio equipment controller further comprising:
  One or more signaling processors the capacity of which is arranged to be pooled for processing signals of UEs served in the two or more cells;
  A radio resource control unit as is claimed in claim 10 or in any of the claims dependent therefrom;
  One or more managers of the downlink control channels and that is/are connected to the radio resource control unit via the second interface, wherein each of the downlink control channels is provided in a respective of the two or more cells. The manager/s of the downlink control channels is/are arranged to upon the receipt of a request from the radio resource control unit admit resources on the downlink control channel to be obtained for at least some of the UEs for which the request relates;
  One or more schedulers that are arranged to schedule the capacity of the downlink data channel and of the uplink data channel of each cell among the UE that are served in the respective cell;
  One or more buffers with control units that are arranged to buffer data waiting for being transmitted on the downlink data channel, and to determine the scheduling weights for the UE for which data is buffered for downlink transmission and to determine scheduling weights for UE that have data to transmit in the uplink.

An advantage provided by the iterative process in several embodiments of the invention summarized above is that it ensures that an UE will be assigned both the hardware resources and the control channel resources that is necessary for the UE to be able to use the resources assigned, thereby eliminating the risk of assigning only one type of resource to the UE, which cannot be used since for successful communication over the data channel both processing resources and resources on the downlink data channel are required. Thereby is achieved efficiency in use of the common hardware resources and of the physical downlink control channel.

A further advantage is that the manager of the downlink control channel receives the request for resources on the control channel in one batch and can then balance its determination of which UEs will obtain the control channel resources to the occupation the downlink control channel taken from the total downlink transmission resources. Thereby, efficient and fair use of radio carrier resources that carries the downlink control channel can be made. In an OFDM system, the resource occupied typically corresponds to the number of OFDM symbols assigned to the downlink control channel of the physical radio carrier. A UE may be denied resources on the downlink control channel if thereby one OFDM symbol can be saved from being used by the downlink control channel.

DETAILED DESCRIPTION

Figure 1A:
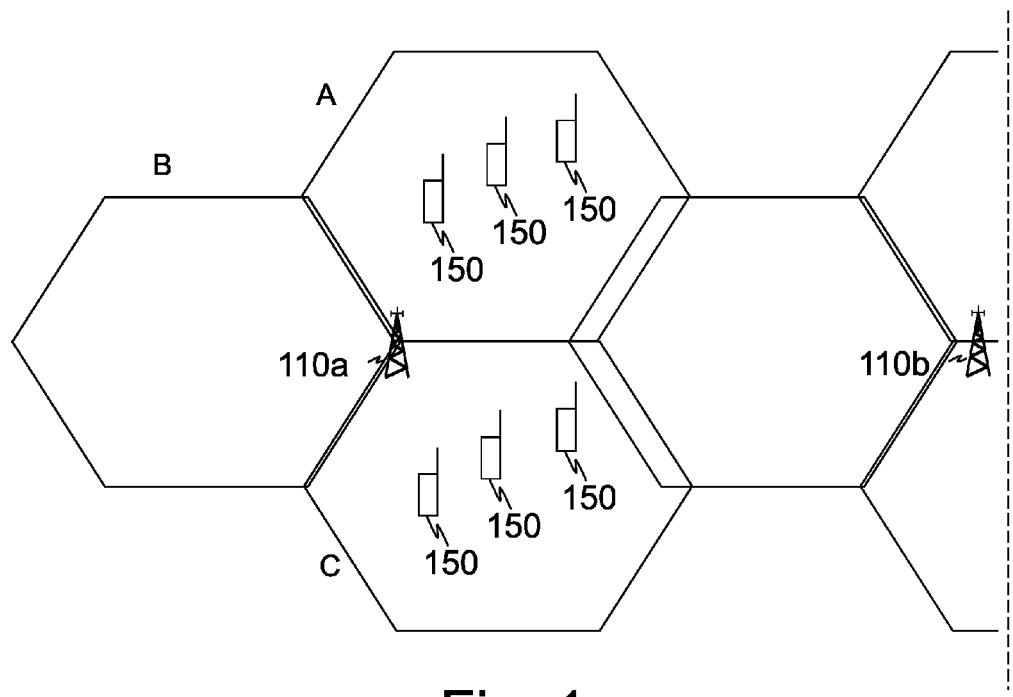
FIGS. 1a and 1b are views of base station sites, cells and UE.

As explained in the background section above, the shared downlink control channel and the shared downlink data channel are sent in the same subframe, on different OFDM symbols. If more symbols are used for the control channel, then fewer are left for carrying downlink data. Allocation of the physical resources for carrying downlink control information as DL assignments and UL grants must be carefully balanced to the need for DL data transmission, while control channel resources must be adequate to ensure that enough DL assignments and UL grants can be carried for the full occupation of physical resources on the air interface for carrying DL data as well as for carrying UL data. This balancing of capacity is made by the scheduler for each transmission time interval (TTI) and per cell.

As is also briefly explained in the background section, there are also limitations in hardware and software capacity for baseband processing in the radio base station. Limitations of the baseband processing may also be based on commercial licensing of processing capacity, where a network provider would like to sell further baseband processing capacity. The result is the same, however, irrespective of whether the limitations arise from physical resource limitations or from restrictions made due to commercial licensing.

The baseband capacity limitation puts a restriction on the number of UE that can be scheduled per transmission time interval (TTI) and site, i.e., limiting the number of UEs that are possible to be scheduled in several cells if more than one cell is served by the same base station. One advantage of the pooling of baseband resources is that more of these may be used in a high loaded cell and less for a cell with little traffic.

If processing resources are first assigned to the UEs in the various cells on the site, and then the scheduling process per cell is initiated, the result may be that not all the UEs that have obtained processing resources also obtain resources on the control channel for receiving the UL grant or the DL assignment. Alternatively, if the scheduling process were adapted to ensure capacity on the control channel for carrying the UL grants and DL assignments that corresponds to the signal processing resources assigned, this may result in a suboptimal allocation of OFDM symbols for carrying the control signaling.

The signaling processing capacity in the cell may be limited in terms of a number of UEs per cell that can be processed, in addition to a limitation with respect to the total number of UEs that can be processed. There may be further restrictions with respect to the number of UEs that can be processed with respect to each of the uplink and downlink communications directions, as well.

With this background, it can be understood that it is a complex task to control the use of processing resources and of resources occupied in the cells for carrying control signaling, in such a way that both type of resources are efficiently used. It is one object of the embodiments disclosed to achieve such an efficient use of processing resources in the radio base station, and of resources on the air interface.

Figure 5A:
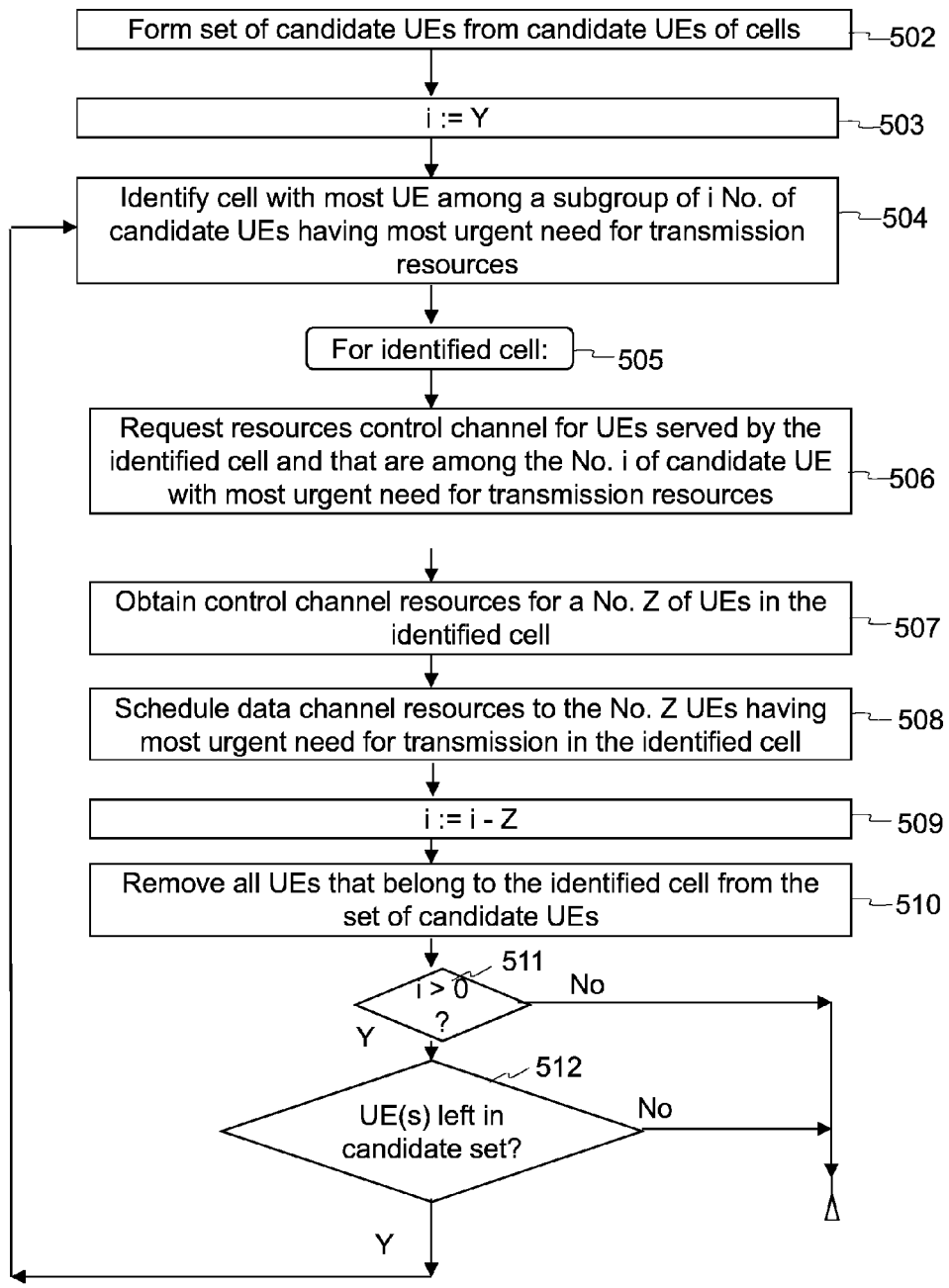
FIGS. 5a and 5b are flowcharts of a method.

FIG. 5a depicts a flow chart of the steps of assigning control channel resources and resources for the data processing in an iterative manner that ensures the UE will be assigned with both types of resources and the resources assigned will be utilized.

Figure 1B:
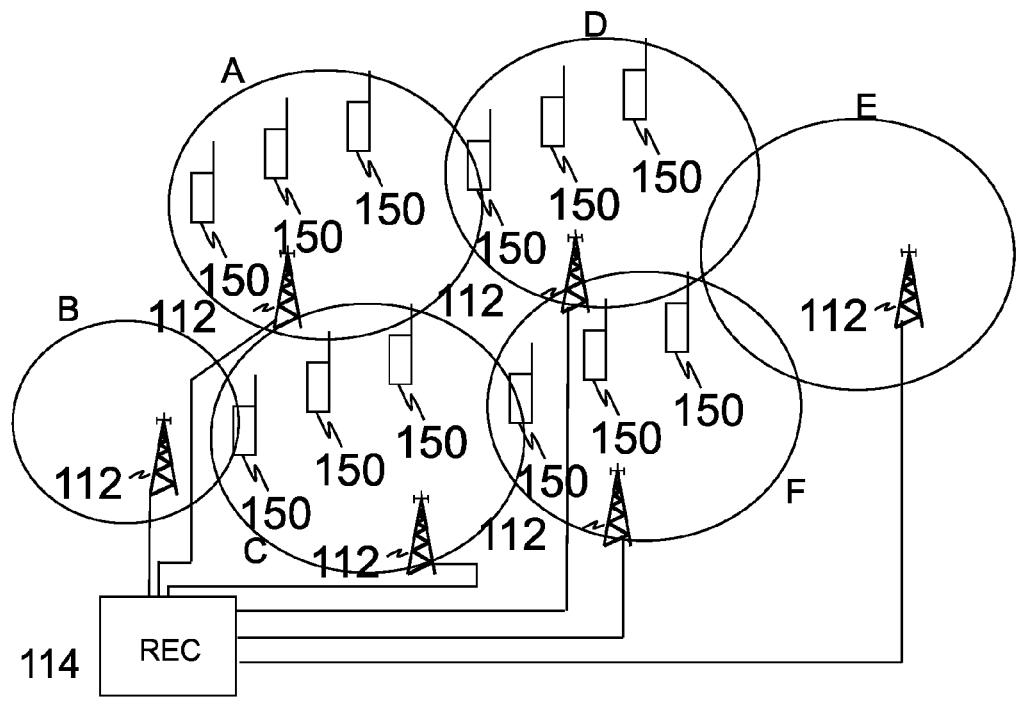
Figure 2B:
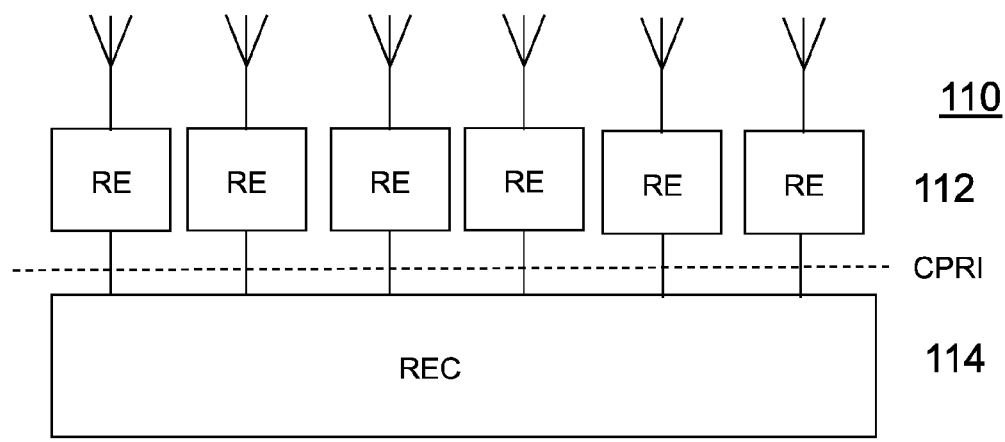

In a first step, 502, a set of candidate UEs is formed from the UEs in all cells that need data transmission resources. "All cells," as used here, means the cells that share the same physical baseband resources, typically the cells A-C and cell A-F that are served by the same radio base station 110, as is depicted in FIGS. 1a and 1b. The data transmission resources needed may be in the downlink direction or in the uplink direction.

In a step, 503, a counter i is set to Y, i:=Y, where Y is the number of UEs that can possibly be scheduled on the site in the same TTI.

In a step 504, the cell on the site that has most UE among number i UE with the most urgent need for transmission resources is identified. The cell identified in step 504, 505, will be referred to as the identified cell and the steps following will be applied to the UEs in the identified cell.

In a step 506, resources on a physical downlink control channel are requested for the UE that are served by the identified cell and that are among the UEs in the identified cell.

Information is received in step, 507, on a number Z occasions for transmissions of a DL assignment or a scheduling grant on the physical downlink control channel in the identified cell.

Resources are scheduled, in step 508, on the uplink shared data channel and on the downlink shared data channel for the number of Z UE that have been assigned resources on the physical downlink control channel in the identified cell. The distribution of the UEs on uplink shared data channel and the downlink shared data channel, depends on the need for communication direction of the respective UE.

The counter i is decremented by the number Z, i:=i−Z, in step 509.

All the UEs that are served by the identified cell are removed from the set of candidate UE, in a step 510.

If the counter i is more than zero, i>0, as is tested in step 511, and if there are still UEs left in the candidate set, as is tested in step 512, then the process is repeated from step 504. Otherwise the process is ended.

These solutions may be implemented in any system that has radio resources that are shared among a number UE and where common physical and computational resources are pooled for the handling of plural UE, typically in several cells. The radio resources described are the physical downlink control channel, which are shared among UEs transmitting in both uplink and downlink directions.

The name of the UE, user equipment, may vary in various types of cellular communication systems, with examples such as mobile terminal, communication terminal. It should be understood that the particular embodiments may be applied in various type of cellular networks, when these systems comprise a downlink channel for transmission of control information in the downlink direction and that carries information on what UE that is assigned resources on data channels in downlink and uplink communication directions.

The solution will be further described with example in the LTE system. In LTE the common channel used for sending information from the base station to the UE of their assignments on the data channel is named Physical Downlink Control Channel (PDCCH), the downlink shared data channel is named Physical Downlink Shared Channel (PDSCH) and the corresponding channel in uplink direction is called the Physical Uplink Shared Channel (PUSCH).

Figure 5B:
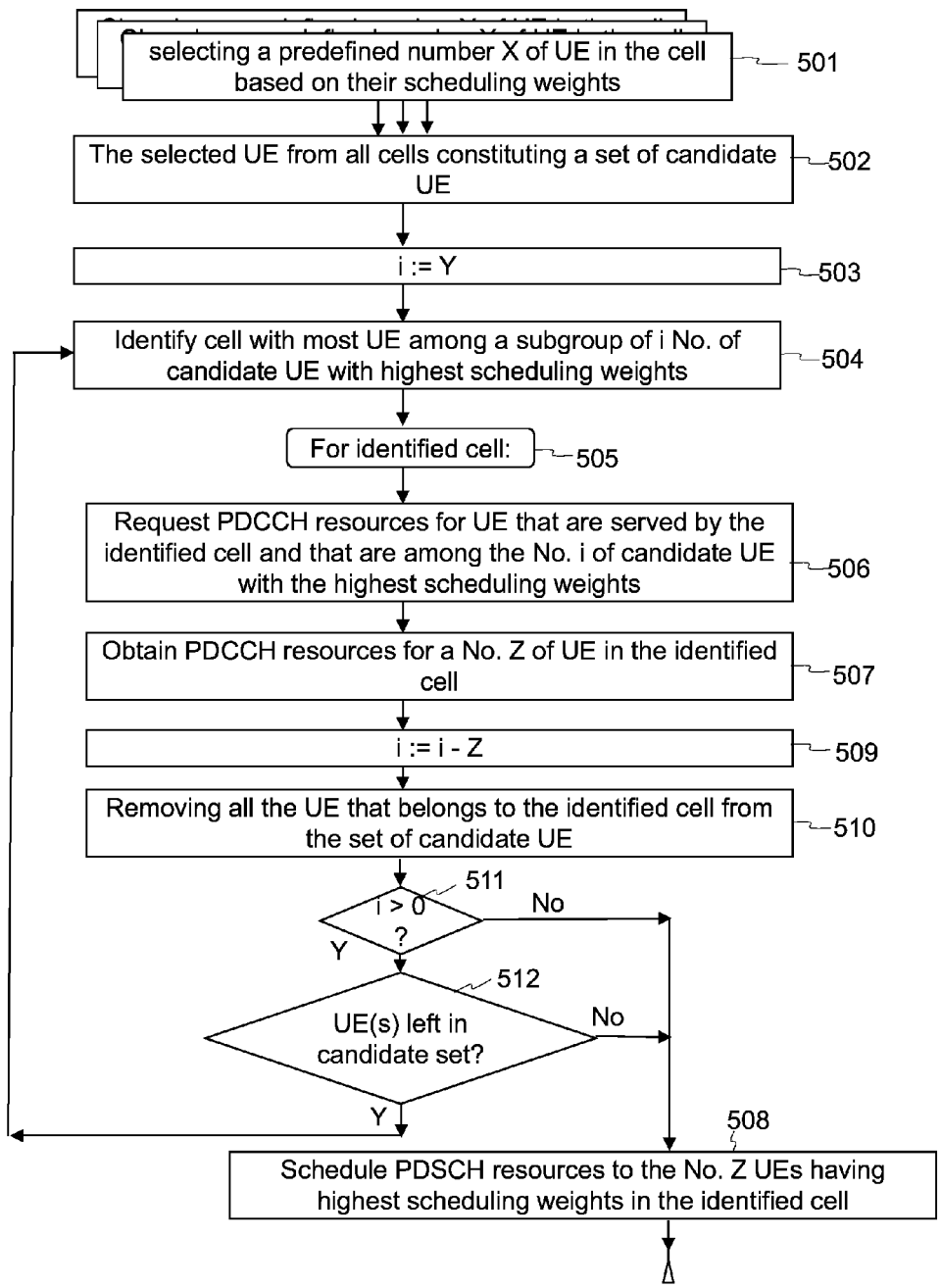

FIG. 5*b* is an embodiment of FIG. 5*a*, which is described, as an example, as implemented in an LTE system. It is further adapted for the situation of the pooled resources for baseband processing that is shared among the cells A-C, A-F, on the site, puts a limit per cell on the maximum number of UE that are possible to schedule in the same TTI. The selection per site is based on the need for transmission resources for the respective UE.

The scheduling process is initiated by step 501, in which a predefined maximum number of UE may be selected in each cell as candidates for DL assignments and UL grants. The selected candidate UE from each cell are handled in the step 502 as is described above. In an embodiment the maximum number of UE for a cell is separated into two groups depending on whether uplink or downlink transmission direction is desired. Each of the two groups may have a corresponding limitation on the number of UE that can be selected as candidates from the cell. Moreover, the maximum number of candidate UE may vary for the different cells.

The need for transmission is based on a scheduling weight that is associated with each UE. The scheduling weight is based on one or more of, the QoS of the service used by the UE, the Channel Quality Indicator (CQI), the amount and waiting time of data buffered. The scheduling weights are used in steps 501, 504, 506, 508 for selecting the UE with the most urgent need for transmission.

FIG. 5*b* also differs from FIG. 5*a* in the order in which the step 508 for scheduling resources on the data channel is performed. Since the iterative process ensures that no more UE are assigned resources on the PDCCH than there is capacity to handle by the baseband processing and by the PDSCH and PUSCH, the scheduling of resources on the PDSCH and the PUSCH can be performed when the PDCCH has been assigned to the UEs and the order of the steps can be varied.

When the set of UE are formed in step 502, one UE may appear twice and with a corresponding scheduling weight for both appearances. That is in the case of there is data buffered for downlink transmission and data buffered for uplink transmission for this UE. The UE then competes for obtaining PDCCH resources for uplink grant and for downlink assignments in step 506 and 507.

The selection of UE in steps 501, 506 is, in some embodiments, adapted to ensure that there is some UE selected for communication in uplink as well as in downlink direction, at least as long as there are some UE with a need for transmission in the uplink and some UE in the downlink. Thereby efficient use of both the PDSCH and PUSCH is ensured. In some environments the scheduling weights used for one of the two communication directions might generally be higher than the scheduling weights in the other direction. The selecting steps 501, 506 may bias the transmission weights for either of the uplink or downlink transmission direction to ensure the capacity of the PDSCH and PUSCH is efficiently utilized.

The procedure is repeated for each scheduling interval, which is the TTI of 1 ms in the LTE system. The processing capacity on the cell may partly be occupied by transmissions that have been scheduled for longer period, by so call semi-persistent scheduling, and that requires no transmission on the PDCCH. There are also some types of downlink control signaling sent over the PDSCH, such as some types of system information, and that does not use of a scheduling assignment. The processing resources available may thus vary between different scheduling intervals. The information on the processing capacity, or on the amount of the processing capacity that have been pre-occupied, is provided to the scheduling process for each scheduling interval.

Figure 6A:
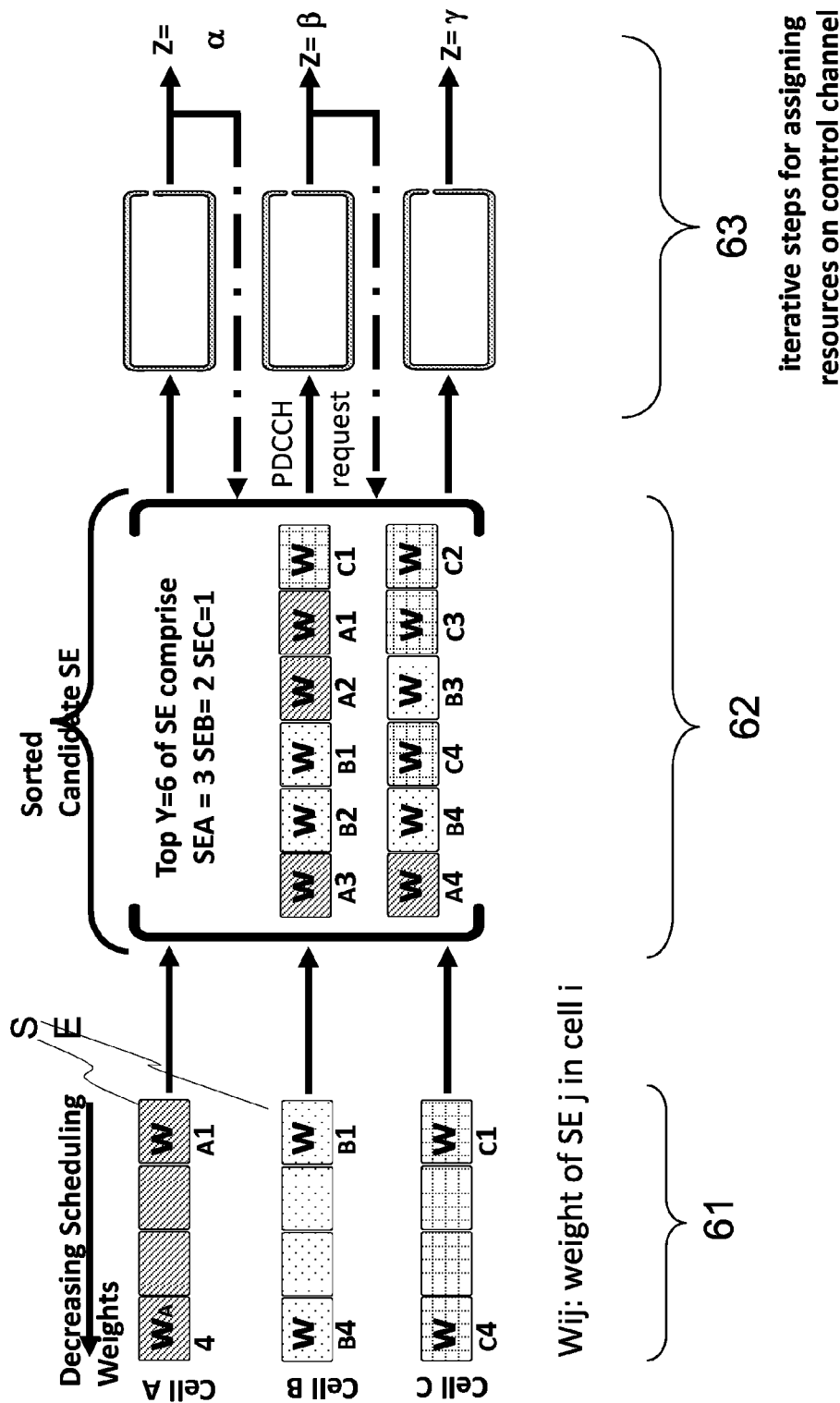
FIGS. 6a and 6b are illustrations of the acts performed in relation to UE in various step over time, from left to right.
Figure 6B:
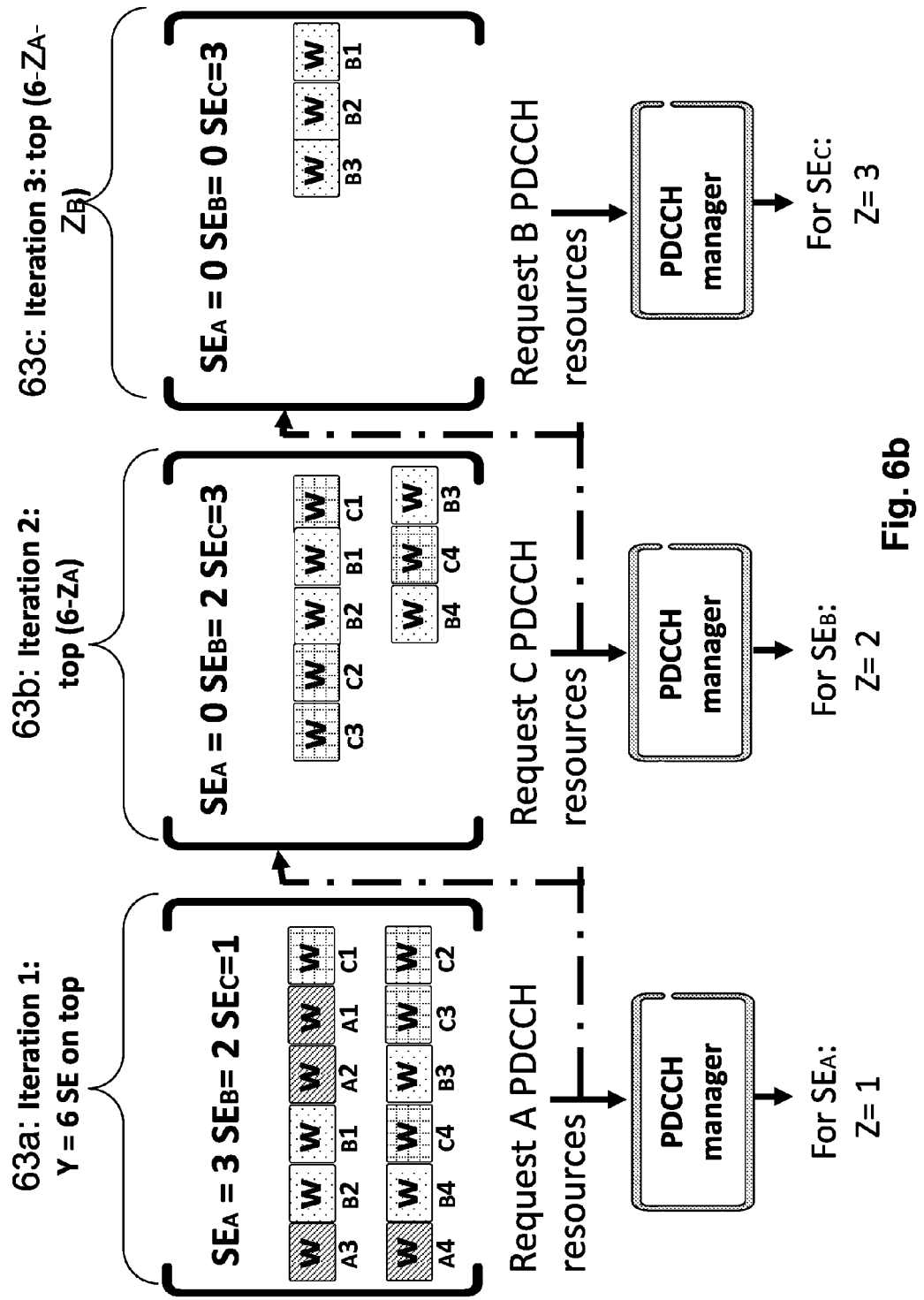

The method will be further exemplified with numerical values of the selected UE and with reference to FIGS. 6*a* and 6*b*. In this example it is expected that there are three cells, A, B, C as depicted in FIG. 1*a* served at the same site and among which baseband processing resources are shared. FIG. 6*a* illustrates, from left to right, three steps 61-63, as are performed on UEs that are illustrated with boxes and are marked with cell specific hatching. Some of the boxes representing the UE also have a letter W with submarking indicating the UE specific scheduling weight.

In a first step 61, four UEs are selected for each cell as candidate UEs for being scheduled. The selected UE are depicted in rows that each corresponds to respective of the three cells A, B and C. Step 61 corresponds to that in step 501, with the maximum possible number of UE per cell defined to be four.

Next, the set of candidate UEs from all three cells are sorted, 62, in the order of their scheduling weights. A top group is formed out of the six UEs with highest scheduling weights, where the number of six is the maximum number of UE possible for the baseband processing per site (i.e. for the three cells together) to handle in one TTI. In this top group, and in this example, three of the UEs are served in cell A, two UE are served on cell B, and one UE is served in cell C. Cell A is thus the cell with most UE in the top group, and the cell identified, 62, for scheduling. The act in step 62 corresponds to those of steps 503-505.

In the step 63 that follows, resources on the PDCCH are requested and some obtained for the UE of the respective cell, with one cell handled at a time in an iterative manner. Cell A was identified in step 62, and in step 63*a* the three UE served by cell A among the top six will be the first for which PDCCH resources are requested. The request is sent to a PDCCH manager and that is in control of the cell A specific PDCCH resources. In this example the PDCCH manager admits and informs of there being PDCCH resources obtained for one UE, the one with the highest scheduling weight. All the UEs served by cell A are then removed from the set of candidate UE.

The iterative process is then resumed in step 63b; a top group is formed and now with a number that corresponds to the number of UE left to be possible to handle for baseband processing. By left to be possible to handle is meant the original maximum number of six for the site, reduced by the number of one for the UE that has already obtained PDCCH resources. Five UE served by cell A and by cell B, are selected to the top group based their scheduling weights, two of which happen to be served by cell B and three served by cell C. The three UE served by cell C are therefore selected and PDCCH resources are requested for them. In the example, PDCCH resources are obtained for two UE in cell C. All the UE that are served by cell C are then removed from the set of candidate UE.

The iterative process is then resumed in step 63c, albeit there are now only UEs served by cell B left in the set of candidate UE. A top group is formed with the original maximum number reduced by the number one UE that was assigned PDCCH resources in step 63a and reduced by the number of two UE that were assigned PDCCH resources in step 63b, thereby including three UE. PDCCH resources are requested for these three UE and obtained for all three UE from the PDCCH manager. The process of receiving PDCCH resources for no more UE than the site has baseband processing capacity for handling is thereby completed. The scheduling of the resources on the PDSCH and on the PUSCH can then be made for the UE that has obtained PDCCH resources. The process of finding the PDCCH resources can be regarded a process separate of that of scheduling the resource on the PDSCH and the PUSCH.

The number of UEs in the example illustrated by FIGS. 6a and 6b have been picked to ease the illustration and understanding of the principles of the embodiments. Typically, more UEs are selected per cell and are possible to baseband process in a site than the numbers used in the example.

Figure 3:
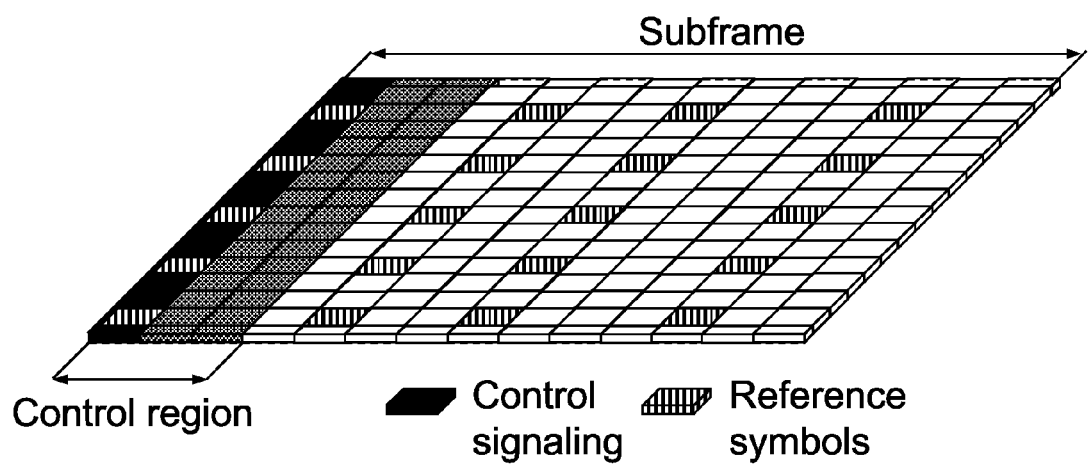
FIG. 3 is a diagram in time and frequency dimensions of the OFDM carrier
Figure 4A:
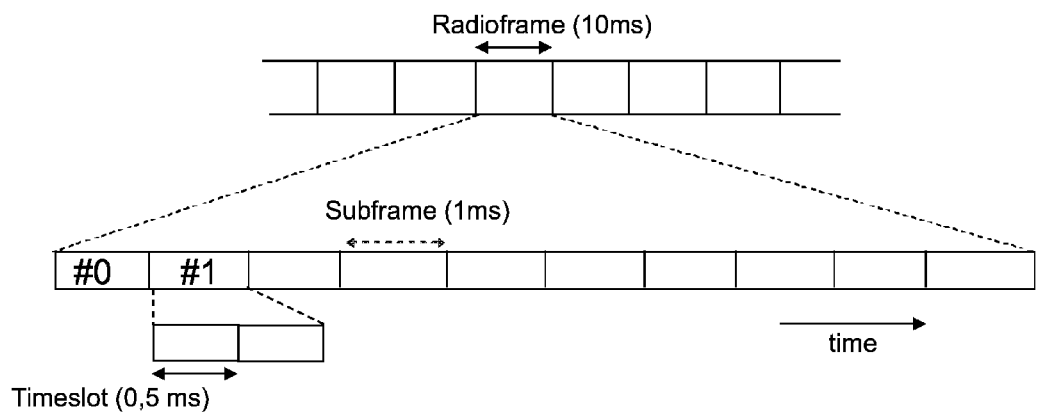
FIG. 4a is a time diagram of the organization of the OFDM carrier.
Figure 4B:
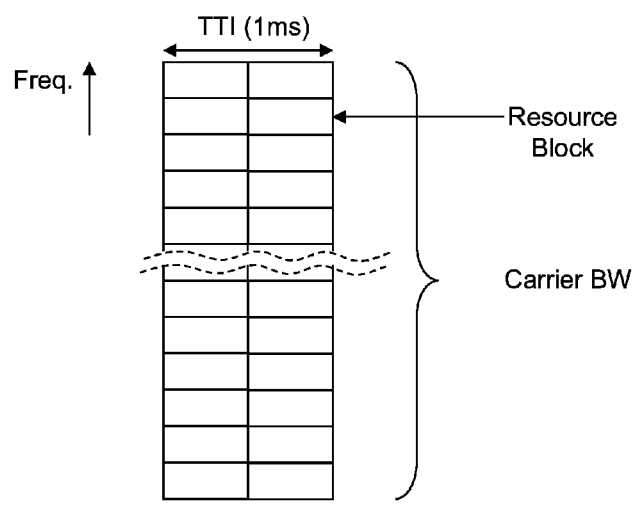
FIG. 4b is the same diagram as FIG. 4a with addition of frequency dimension.

The request for PDCCH resources is sent to a PDCCH manager in steps 506 and 63, and resources are obtained, 507, 63, for all or less than all the UEs that the request relates to. The PDCCH manager determines which of UEs that will obtain PDCCH resources in the cell based on:

The amount of resources on the PDCCH needed by respective UE, in terms of the number of resource elements, RE, needed for carrying the DL assignment or the UL grant to the UE. The number of RE is based on the quality of the PDCCH channel as received by the UE and reported in a CQI. An RE corresponds to a square in the grid illustrated in FIG. 3.

The number of UE that compete for obtaining resources on the PDCCH

Efficiency in the use of the number of OFDM symbols occupied for control in the sub-frame. The number of OFDM symbols carrying the control signaling can be varied between subframes and occupy 1, 2, 3 or 4 of the total 14 OFDM symbols in the subframe. If letting a further UE be assign PDCCH resources results in an additional OFDM symbol need be taken into use for the extra UE, and will be poorly utilized, the PDCCH manager may advantageously deny the extra UE PDCCH resources in the TTI.

Figure 2A:
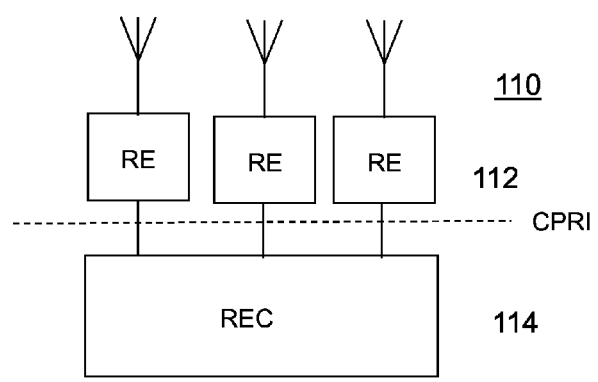
FIGS. 2a and 2B are block diagrams of base stations.
Figure 7:
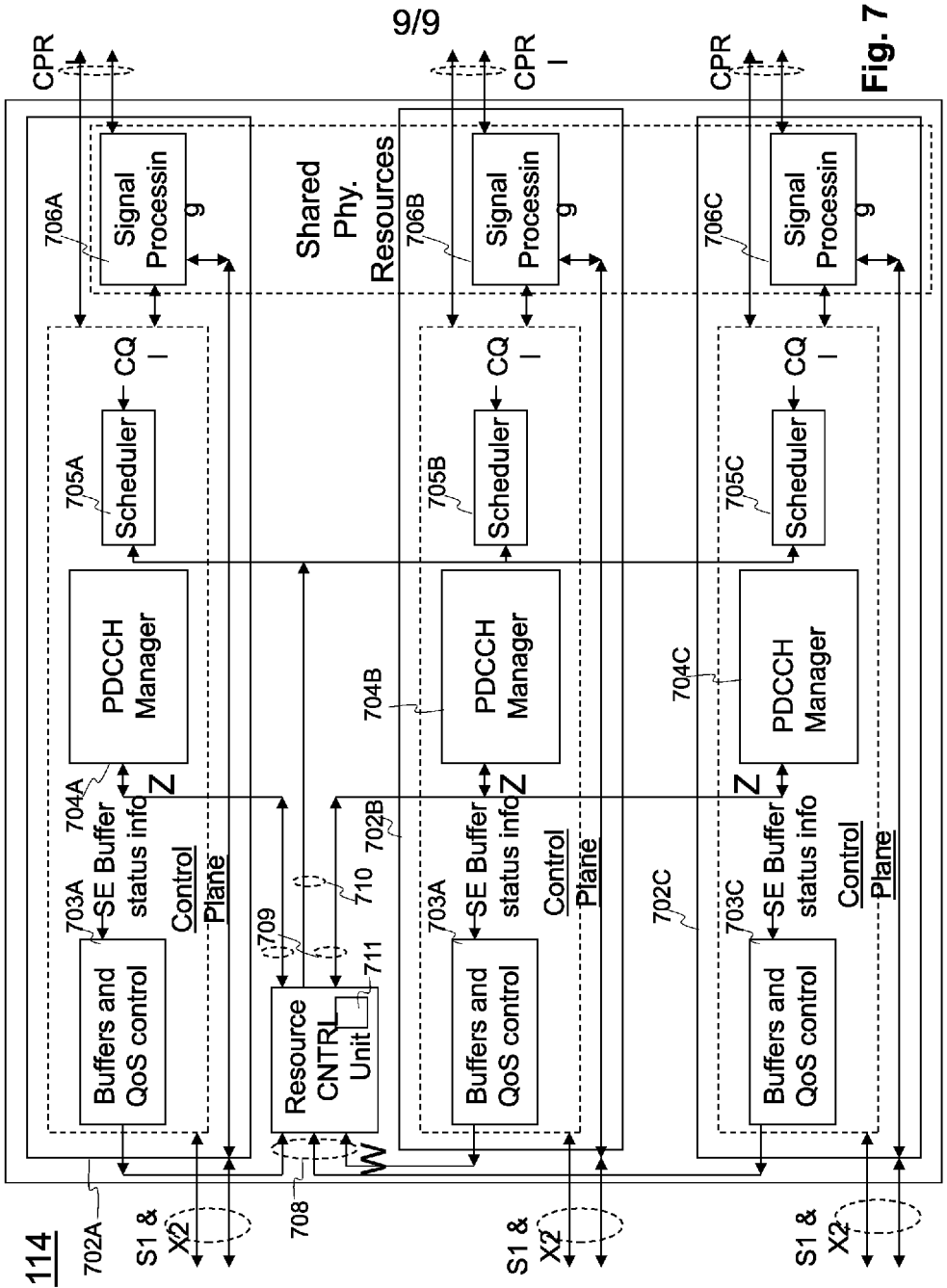
FIG. 7 is a block diagram of the radio equipment controller part of a radio base station.

FIG. 7 is a block diagram of a Radio Equipment Controller (REC) 114, which in combination with one or more RE (Radio Equipments) that are depicted in FIGS. 2a and 2a, forms a radio base station. The REC 114 connects to the REs over the CPRI and each RE serves a corresponding cell, sends and receives baseband radio signal and control signals to and from the REC 114 over the CPRI.

In the example it is assumed that the REC 114 in FIG. 7 serves three cells, A, B, C and is logically organized into three blocks, 702A, 702B, 702C for serving traffic in respective of the three cells. The blocks 702 are separated into a group 709 of units handling the control plane and into signal processing 706 of baseband signals. Baseband processing is logically separated for the three cells, while it should be understood that the physical realization of the baseband processing may be realized in one or several signal processors 706. The capacity of the one or more signaling processors is pooled for processing of signals that relate to UEs in all of the three cells A, B, C. The advantage is the capacity can be used for handling signals in cell with high traffic, and less be used for processing of signals in a cell with low traffic. There is a limit on the total number of UE possible to signal process. There may also be a limit on the maximum number of UEs in one cell whose signals may be processed. There may further be a limitation on the number of UE with respect to each of the uplink and downlink communication directions whose signal may be processed.

The signal processor or processors 706 may represent or include any form of processing component, including digital signal processors (DSPs), dedicated microprocessors, general-purpose computers, or other devices capable of processing electronic information. Further examples of signal processor or processors 706 include field-programmable gate arrays (FPGAs), programmable microprocessors, application-specific integrated circuits (ASICs), and any other suitable specific- or general-purpose processors.

The control plane unit 702 comprises buffers and QoS control unit 703, which buffer data before downlink transmission to the UE. The buffers and QoS unit 703 further has an input for receiving information on the data amount in UE buffers waiting for uplink transmission. The buffers and QoS unit 703 further possess information on the QoS associated with the UEs. The buffers and QoS unit 703 is further adapted to produce the scheduling weights W that is associated with each of the UE for which data is buffered.

The control plane units 702 further comprise PDCCH manager 704 and that determines which UE will obtain resources on the PDCCH.

The control plane units 702 further comprise a scheduler 705, which is arranged to schedule resources on the PDSCH and on the PUSCH for the UE. The scheduler is provided with CQI as received from the UEs in uplink control signaling and with information on the quality of the PUSCH signal from the UEs, and based on this information and CQI the scheduler determines what resource blocks and how many to be assigned to the UEs.

REC 114 further comprises a resource control unit 701 that comprises a first interface 708, which is adapted to receive the scheduling weights W from the buffers and QoS units 703, form a set of candidate UE among the UE for which the scheduling weights are received, to request and receive information on resources obtained on the PDCCH from the PDCCH manager for the UE that relate to one cell at the time. Information is exchanged with the PDCCH manager over a second interface 708 and information on the number Z UE for which resources are obtained in a batch of one cell is indicated in FIG. 7. Information on for which UE that the PDCCH resources are obtained is also received from the PDCCH control manager 704. The resource control unit 701 is further connected to the schedulers 705, via a third interface 710, and informs the schedulers 705 on the transmission weights and PDCCH resources obtained for the UE to which this information relates. The resource control unit 701 possesses information on the capacity of the signaling processors/s 706, in terms of the total number of UE whose signals may be processed. The resource control unit 701 may further possess information on their being any cell specific limitations on the number of UE whose signals can be processed, or on restriction in the number of UE in respective uplink and downlink communication direction whose signals may be processed.

The resource control unit 701 may further receive information from the scheduler 705 on resources that have been semi-persistently scheduled or that are occupied by any transmission that need to scheduling assignment, such as system information that may be sent to all the UE in a cell. The information is received via the third interface 710, and the resource control unit 701 is adapted to reduce the processing capacity that is available for being assigned among the candidate UE in the relevant TTI. The result is that fewer UEs can be scheduled the more of the processing capacity that has been preoccupied.

The resource control unit 701 is physically realized by a memory storing software program and any form of processing component, including dedicated microprocessors, general-purpose computers, or other devices capable of processing electronic information. When the software is executed on the resource control unit 701, the resource control unit is adapted to perform the method as is described in connection to FIG. 5a, FIG. 5b or to FIGS. 6a, 6b, with exception of step 508 and that is performed by the scheduler 705.

Examples of processors that may be used for realizing the resource control unit 701 include field-programmable gate arrays (FPGAs), programmable microprocessors, digital signal processors (DSPs), application-specific integrated circuits (ASICs), and any other suitable specific- or general-purpose processors including electrical circuits. The software when run on the resource control unit 701 makes the resource control unit execute the method as disclosed in any of FIG. 5a, 5b or 6a and 6b, with exception of the step 508 and that is performed by the schedulers 705.

It is also possible to realize the resource control unit 701 by pure hardware electrical circuits. Implementation by one or more processors with software is generally preferred to be used, because it allows for a more flexible utilization of capacity in the REC 114. Also, pooling of processor capacity for scheduling in two or more cells, for handling the PDCCH managing in two or more cells and for realizing the buffers and QoS control unit 703 for two or more cells have the advantage of flexibility in the utilization of the available capacity among the various functions and distribution of traffic among the cells. Moreover, when the traffic demand in the cell has grown such that more cells are needed or the cells that are maintained need to have higher capacity the pooling of resources eases addition of further processors to the REC. The PDCCH managers for the three cells in the example may thus be realized one, two, three or more processors. Similarly, the schedulers 705A-705C may be realized by one, two, three or more processors. Moreover, the same physical processors may be used for realizing the PDCCH manager and the Scheduler alternately. Software shall be adapted for this type of processing by pooled resources.

Since the RE is described with example in the LTE the PDCCH manager refers to the name of the downlink control channel in the LTE system. It should be understood that the function of this manager could be applied to any system which has a common downlink control channel that carries information to the UE on their UL grants and downlink assignments. The embodiments disclosed well suited for systems that use OFDM access types while it may also be applied to systems with radio access technology other than OFDM, as long as this system have common downlink data channel and data channel in uplink and or downlink direction that is shared among UE.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

What is claimed is:

1. A method for allocating shared radio resources among a plurality of user equipments (UEs) in a group of cells that are supported by common processing resources, wherein each of said UEs is served by one of said cells, the method comprising:
   a) forming a set of candidate UEs that comprise UEs from the group of cells and that need transmission resources;
   b) setting counter i:=Y, where Y is a predefined number of UEs possible for the common processing resources to process for said group of cells;
   c) identifying a cell among said group of cells that has most UEs within a subgroup comprising a number i of the candidate UEs with the most urgent need for transmission resources;
   for the cell identified in step c), performing the further steps of:
   d) requesting control channel resources in the cell identified for those of the candidate UE within the number i UEs with the most urgent need for transmission resources and that are served by the cell identified;
   e) obtaining control channel resources in the cell identified for a number of Z UE;
   f) i:=i−Z;
   g) removing all the UEs that are served by the identified cell from the set of candidate UEs;
   if i>0 and if there is/are still some UE(s) in the candidate set of UEs, then repeat from step d), otherwise wait until another scheduling occasion and then repeat from step a).

2. The method of claim 1, further comprising scheduling resources on a data channel in each cell of the respective cell for UEs that have obtained control channel resources in step e).

3. The method of claim 2, in which said data channel is one channel in the uplink direction and one channel in the downlink direction in each cell and that are shared among the UE of the respective cell.

4. The method of claim 3, wherein the predefined number X is cell specific, and wherein the predefined number X shall comprise at least one UE with need for transmission in uplink direction and at least one UE with need for transmission in downlink direction, provided there is/are any UE(s) in the cell with need for transmission in uplink direction and provided there is/are any UE(s) in the cell with need for transmission in downlink direction.

5. The method of claim 3, wherein the set of candidate UEs are formed by a predefined maximum number X of UEs as selected from their respective cells based on their urgency for transmission resources, and wherein the predefined number X shall comprise at least one UE with need for transmission in uplink direction and at least one UE with need for transmission in downlink direction, provided there is/are any UE(s) in the cell with need for transmission in uplink direction and provided there is/are any UE(s) in the cell with need for transmission in downlink direction.

6. The method of claim 1, where the set of candidate UEs are formed by a predefined maximum number X of UEs as selected from their respective cells based on their urgency for transmission resources.

7. The method of claim 6, wherein the predefined number X is cell specific.

8. The method of claim 1, where the urgency for transmission resources is determined from a UE specific scheduling weight associated with each of the UE.

9. The method of claim 8, wherein the scheduling weight is based on at least one of: a QoS associated with the UE; the amount of data buffered for transmission to or from the UE; and the time the data has been buffered.

10. The method of claim 1, where a first UE with a need for transmission in a first direction of the uplink or downlink is given preference over a second UE with need for transmission in opposite direction, when control channel resources are requested in step d), despite that the urgency for transmission is higher for the second UE than for the first UE.

11. A radio resource control unit suitable for a radio base station supporting communication in two or more cells and which radio base station has signaling processor resources that are pooled for supporting the two or more cells and that have limited capacity, the radio resource control unit comprising:
  a first interface to receive scheduling weights, wherein each scheduling weight is associated with a UE and associated with one of said cells in which the UE is served;
  a second interface coupled to one or more managing unit/s of the resources on a downlink control channel in each cell; and
  a processor;
  a memory storing program instructions, wherein the processor is configured to execute the program instructions to:
  a) form a set of candidate UEs based on their scheduling weights as received over the first interface wherein the set of candidate UEs comprises UEs from the two or more cells,
  b) set a counter i:=Y, where Y is a predefined number of UEs possible for the signaling processing resources to process for said group of cells,
  c) identify a cell among said group of cells that has most UEs within a subgroup comprising a number i of the candidate UEs with the highest scheduling weights, for the cell identified in step c) performing the further steps of
    d) requesting, via the second interface, control channel resources in the cell identified for those of the candidate UEs within the number i UEs with the highest scheduling weights and that are served by the cell identified,
    e) receiving, via the second interface, information on obtained control channel resources in the cell identified for a number of Z UEs,
    f) setting counter i:=i−Z,
    g) removing all the UEs that are served by the identified cell from the set of candidate UEs, and
    if i>0 and if still some UE/s in the candidate set of UEs then repeating from step d), otherwise waiting until another scheduling occasion and then repeating from step a).

12. The radio resource control unit of claim 11, further comprising a third interface to one or more schedulers that is/are arranged to schedule the UEs on the uplink and downlink common data channels in the two or more cells, and wherein the resource control unit processor is further configured to inform the one or more schedulers of which UE(s) that have obtained control channel resources.

13. The radio resource control unit of claim 11, where the processor is further configured to form the set of candidate UEs with a predefined maximum number of UEs from each of the cells.

14. The radio resource control unit of claim 11, wherein the processor is further configured to give preference to a first UE with a need for transmission in a first direction of either the uplink or downlink over a second UE with need for transmission in opposite direction, when control channel resources are requested in step d), despite that the scheduling weight is higher for the second UE than for the first UE.

15. A radio base station that comprises two or more radio equipments that are arranged to handle radio communication in a respective cell (A-C, A-F) and a radio equipment controller with an interface to the radio equipments and arranged to exchange baseband radio signals and control signals over the interface with the radio equipments, the radio equipment controller further comprising:
  one or more signaling processors, the capacity of which is arranged to be pooled for processing signals of UEs served in the two or more cells;
  the radio resource control unit of claim 11;
  one or more managers of the downlink control channels and that is/are connected to the radio resource control unit via the second interface, wherein each of the downlink control channels is provided in a respective of the two or more cells, and upon a request received from the radio resource control unit the manager/s of the downlink control channels is arranged to admit resources on the downlink control channel to be obtained for at least some of the UEs for which the request relates;
  one or more schedulers that are arranged to schedule the capacity of downlink data channel and an uplink data channel of each cell among the UEs that are served in the respective cell;
  one or more buffers with control units arranged to buffer data waiting for transmission on the downlink data channel, and to determine the scheduling weights for the UEs for which data is buffered for downlink transmission and to determine scheduling weights for UEs that have data to transmit in the uplink.

* * * * *